US011185915B2

(12) United States Patent
Herle

(10) Patent No.: US 11,185,915 B2
(45) Date of Patent: Nov. 30, 2021

(54) DEPOSITION OF REACTIVE METALS WITH PROTECTION LAYER FOR HIGH VOLUME MANUFACTURING

(71) Applicant: Applied Materials, Inc., Santa Clara, CA (US)

(72) Inventor: Subramanya P. Herle, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/996,525

(22) Filed: Aug. 18, 2020

(65) Prior Publication Data
US 2021/0060638 A1    Mar. 4, 2021

Related U.S. Application Data

(60) Provisional application No. 62/894,131, filed on Aug. 30, 2019.

(51) Int. Cl.
*B22D 11/06* (2006.01)
*B22D 11/00* (2006.01)
(Continued)

(52) U.S. Cl.
CPC ........ *B22D 11/0611* (2013.01); *B22D 11/001* (2013.01); *B22D 11/144* (2013.01); *H01M 4/0409* (2013.01)

(58) Field of Classification Search
CPC ....... B22D 11/00; B22D 11/001; B22D 11/06; B22D 11/0611; B22D 11/14; B22D 11/144; H01M 4/04; H01M 4/0409
(Continued)

(56) References Cited

U.S. PATENT DOCUMENTS 6,655,446 B2    12/2003    Liebermann et al.
7,794,630 B2     9/2010    Cattaneo et al.
(Continued)

OTHER PUBLICATIONS

Angell, Ionic Liquids, Superionic glasses, Quasi-Ionic Liquids, Quasi-Liquid Ionics, all with High Conductivities but Some with Little Fluidity. Where does the Paradigm End?, ECS Transactions, 64 (4) 9-20 (2014).
(Continued)

*Primary Examiner* — Kevin P Kerns
(74) *Attorney, Agent, or Firm* — Patterson & Sheridan, LLP

(57) ABSTRACT

A method and apparatus for manufacturing a flexible layer stack, and to a flexible layer stack. Implementations of the present disclosure particularly relate to a method and apparatus for coating flexible substrates with a low melting temperature metal or metal alloy. In one implementation, a method is provided. The method includes delivering a transfer liquid to a quenching surface of a rotating casting drum. The method further includes forming a material layer stack over the rotating casting drum by delivering a molten metal or molten metal alloy toward the quenching surface of the rotating casting drum. The method further includes transferring the material layer stack from the rotating casting drum to a continuous flexible substrate, wherein the quenching surface of the rotating casting drum is cooled to a temperature at which the layers of the material layer stack solidify.

20 Claims, 4 Drawing Sheets

(51) Int. Cl.
   *B22D 11/14* (2006.01)
   *H01M 4/04* (2006.01)
(58) Field of Classification Search
   USPC .................................. 164/461, 463, 488, 437
   See application file for complete search history.

(56) References Cited

U.S. PATENT DOCUMENTS

| | | | |
|---|---|---|---|
| 10,337,081 | B2 | 7/2019 | Reed, Jr. et al. |
| 2014/0290861 | A1 | 10/2014 | Dieguez-Campo et al. |
| 2019/0329545 | A1* | 10/2019 | Shibamoto et al. ... C08F 220/28 |

OTHER PUBLICATIONS

MacFarlane, et al., Energy Applications of Ionic Liquids, Energy Environ. Sci., 2014, 7, 232-250.

Kuhnel, et al., Comparison of the Anodic Behavior of Aluminum Current Collectors in Imide-based Ionic Liquids and Consequences on the Stability of High Voltage Supercapacitors, Journal of Power Sources 249 (2014) 163-171.

Simone, et al., Phase Behavior and Ionic Conductivity of Concentrated Solutions of Polystyrene-Poly(ethylene oxide) Diblock Copolymers in an Ionic Liquid, ACS Applied Materials and Interfaces, 1 (12) 2812-2820.

Elabd, et al., Solid-State Lithium-Ion Battery Development, PILbloX Lithium-ion Polymerized Ionic Liquid Block Copolymer Solid-State Electrolytes, Jul. 29, 2013, 18 pp.

Best, et al., Ionic Liquid Electrolytes—enabling the Future of High Energy Automotive Battery Technology, presented at Advanced Automotive Battery Conference Feb. 3-7, 2014, Atlanta, GA, Research sponsored by CISRO, Australia, 12 pp.

Lenert, et al., (Solar Thermal) Heat Transfer Fluids, Annual Review of Heat Transfer 15, 2012, 55 pp.

Ibaraki et al., Planar-Flow Spin Casting: Puddle Dynamics and Process Behavior, Journal of Materials Science, Nov. 1992, 8 pp.

* cited by examiner

DEPOSITION OF REACTIVE METALS WITH PROTECTION LAYER FOR HIGH VOLUME MANUFACTURING

CROSS-REFERENCE TO RELATED APPLICATIONS

This application claims benefit of U.S. provisional patent application Ser. No. 62/894,131, filed Aug. 30, 2019. The aforementioned related patent application is herein incorporated by reference in its entirety.

BACKGROUND

Field

The present disclosure generally relates to a method and an apparatus for manufacturing a flexible layer stack, and to a flexible layer stack. The present disclosure particularly relates to a method and apparatus for coating flexible substrates with a low melting temperature metal or metal alloy.

Description of the Related Art

Processing of flexible substrates, such as plastic films or foils, is in high demand in the packaging industry, semiconductor industries and other industries. Web substrate systems process webs of numerous types of flexible substrate materials. Flexible substrates can be processed with processes, such as PVD, CVD, PECVD, etching, thermal processing, or the like.

Processing can include coating of a flexible substrate with a desired material, such as a low temperature metal or metal alloy material. Web substrate systems generally include a processing drum, e.g., a cylindrical roller, coupled to a system for transporting the substrate. In these deposition systems, the flexible substrate is tightly spooled over a rotating processing drum positioned above a deposition source, such as an evaporation source. The flexible substrate material receives a very high thermal heat load during deposition from condensing metal and from radiant heat, which typically increases with the deposition rate. Thus, when operating at high transport rates to achieve high coating speeds, the thermal heat load can cause the web material to wrinkle and crease on the drum. The wrinkling and creasing on the drum can permanently damage the flexible substrate. As a result, the thermal conductance between the flexible substrate and the processing drum plays a role in controlling the temperature rise of the flexible substrate as it is coated. Thus, the temperature rise sets an upper limit on the coating speed for a given flexible substrate and deposition process.

Therefore, there is a need for methods and apparatus for the deposition of low melting temperature metals and metal alloys on flexible substrates.

SUMMARY

Implementations described herein generally relate to a method and an apparatus for manufacturing a flexible layer stack, and to a flexible layer stack. Implementations of the present disclosure particularly relate to a method and apparatus for coating flexible substrates with a low melting temperature metal or metal alloy. In one aspect, a method is provided. The method includes delivering a transfer liquid to a quenching surface of a rotating casting drum. The method further includes forming a material layer stack over the rotating casting drum by delivering a molten metal or molten metal alloy toward the quenching surface of the rotating casting drum. The method further includes transferring the material layer stack from the rotating casting drum to a continuous flexible substrate, wherein the quenching surface of the rotating casting drum is cooled to a temperature at which the layers of the material layer stack solidify.

Implementations can include one or more of the following. The transfer liquid forms a peeling layer on the quenching surface of the rotating casting drum. The transfer liquid is selected from ionic liquids, synthetic oils, mineral oils, molten salts, or a combination thereof. The transfer liquid is applied to the casting drum via roller coating process. A surface protection film is formed on the peeling layer prior to delivering the molten metal or molten metal alloy toward the quenching surface of the rotating casting drum. The surface protection film is formed by delivering a protection layer forming liquid toward the quenching surface, which solidifies on the peeling layer to form the surface protection film. The surface protection film is selected from LiF, $BiTe_3$, Cu, Sn, $LiNO_3$, sulfide, or a combination thereof. The continuous flexible substrate is a copper substrate and the molten metal is lithium. The continuous flexible substrate is a copper substrate having an anode film formed thereon and the molten metal is lithium. The molten metal or molten metal alloy is selected from the group consisting of alkali metals, magnesium, zinc, cadmium, aluminum, gallium, indium, thallium, tin, lead, antimony, bismuth, and tellurium, alkali earth metals, silver, or a combination thereof. The continuous flexible substrate is guided through a vacuum chamber using a roller arrangement. Transferring the material layer stack from the rotating casting drum to the continuous flexible substrate further includes removing the material layer stack from the peeling layer. The molten metal or molten metal alloy is delivered toward the quenching surface of the rotating casting drum by a deposition process selected from sputtering, thermal evaporation, e-beam evaporation, slot-die coating, casting nozzle coating, roller coating, subsonic spraying, electrostatic spraying, gas pressure spraying, thermal spraying, and plasma spraying. The molten metal or molten metal alloy is delivered toward the quenching surface of the rotating casting drum by a spraying process selected from subsonic spraying, electrostatic spraying, gas pressure spraying, thermal spraying, and plasma spraying.

In another aspect, a method is provided. The method includes delivering an ionic liquid to a quenching surface of a rotating casting drum, wherein the quenching surface is cooled to a temperature at which the ionic liquid solidifies to form a peeling layer on the rotating casting drum. The method further includes forming a surface protection layer over the rotating drum and on the peeling layer. The method further includes forming a material layer stack over the rotating casting drum, including delivering a molten lithium metal onto the surface protection layer and over the quenching surface of the rotating casting drum. The method further includes transferring the material layer stack from the rotating casting drum to a continuous flexible substrate, wherein the quenching surface of the rotating casting drum is cooled to a temperature at which the layers of the material layer stack solidify.

Implementations can include one or more of the following. The continuous flexible substrate is guided through a vacuum chamber using a roller arrangement. Transferring the material layer stack from the rotating casting drum to the continuous flexible substrate further includes removing the material layer stack from the peeling layer. The molten lithium metal is delivered toward the quenching surface of the rotating casting drum by a deposition process selected from sputtering, thermal evaporation, e-beam evaporation, slot-die coating, casting nozzle coating, roller coating, subsonic spraying, electrostatic spraying, gas pressure spraying, thermal spraying, and plasma spraying. The molten metal or molten metal alloy is delivered toward the quenching surface of the rotating casting drum by a spraying process selected from subsonic spraying, electrostatic spraying, gas pressure spraying, thermal spraying, and plasma spraying.

In yet another aspect, an apparatus is provided. The apparatus includes a chamber defining a process region. The apparatus further includes an unwinding roller operable to transport a continuous flexible substrate to be processed through the processing region. The apparatus further includes a winding roller operable to receive the continuous flexible substrate having one or more thin films deposited thereon. The apparatus further includes a pair of rotatable casting drums positioned in the processing region on opposite sides of a travel path of the continuous flexible substrate, wherein each rotatable casting drum includes a curved quench surface. The apparatus further includes a first deposition source arrangement positioned in the processing region to deposit a molten metal film on the quench surface of each rotatable casting drum.

Implementations can include one or more of the following. The apparatus further includes a second deposition source arrangement positioned to deposit a surface protection film on the quench surface of each rotatable casting drum. The second deposition source arrangement is positioned to deposit the surface protection film on the quench surface prior to deposition of the molten metal film by the first deposition source arrangement. The apparatus further includes a peeling layer deposition source arrangement operable to deliver a transfer liquid to the quench surface of the casting drum. The peeling layer deposition source arrangement is positioned to deposit the transfer liquid on the quench surface prior to deposition of the molten metal film by the first deposition source arrangement. The first deposition source arrangement includes one or more deposition sources selected from a sputtering source, a thermal evaporation source, an e-beam evaporation source, a slot-die coating source, a casting nozzle coating source, a roller coating source, a Meyer rod coating source, a planar flow melt-spin source, a subsonic spray source, an electrostatic spray source, a gas pressure spray source, a thermal spray source, and/or a plasma spray source. The second deposition source arrangement includes one or more deposition sources selected from a sputtering source, a thermal evaporation source, an e-beam evaporation source, a slot-die coating source, a casting nozzle coating source, a roller coating source, a Meyer rod coating source, a planar flow melt-spin source, a subsonic spray source, an electrostatic spray source, a gas pressure spray source, a thermal spray source, and/or a plasma spray source. Each casting drum has coolant channels operable to contain a coolant for cooling the quench surface of each casting drum.

In yet another aspect, a non-transitory computer readable medium has stored thereon instructions, which, when executed by a processor, causes the process to perform operations of the above apparatus and/or method.

BRIEF DESCRIPTION OF THE DRAWINGS

So that the manner in which the above-recited features of the present disclosure can be understood in detail, a more particular description of the implementations, briefly summarized above, can be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1:
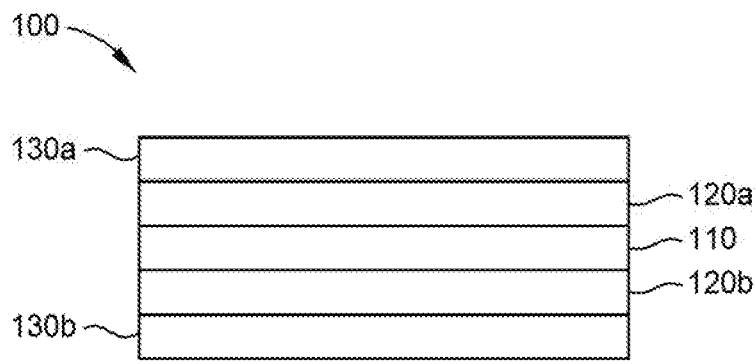
FIG. 1 illustrates a schematic cross-sectional view of one example of a flexible layer stack formed according to one or more implementations described herein.

To facilitate understanding, identical reference numerals have been used, where possible, to designate identical elements that are common to the figures. It is contemplated that elements and features of one implementation can be beneficially incorporated in other implementations without further recitation.

DETAILED DESCRIPTION

Reference will now be made in detail to the various examples of the disclosure, one or more examples of which are illustrated in the figures. Within the following description of the drawings, the same reference numbers refer to the same components. Generally, the differences with respect to individual examples are described. The examples are provided by way of explanation of the disclosure and are not meant as a limitation of the disclosure. Further, features illustrated or described as part of one example can be used in conjunction with other examples to yield a further example. It is intended that the description include such modifications and variations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a roll-to-roll coating system, such as TopMet® roll-to-roll coating system, SMARTWEB® roll-to-roll sputter system, TOPBEAM® roll-to-roll coating system, SOFT LINE® screen printing system, all of which are available from Applied Materials, Inc. of Santa Clara, Calif. Other tools capable of performing sputtering processes and/or high rate evaporation processes can also be adapted to benefit from the implementations described herein. In addition, any system enabling high rate evaporation processes and or sputtering processes described herein can be used to advantage. The apparatus description described herein is illustrative and should not be construed or interpreted as limiting the scope of the implementations described herein. It should also be understood that although described as a reel-to-reel process, the implementations described herein can also be performed on discrete substrates.

According to some examples described herein, a flexible substrate includes among other things, flexible materials, porous polymeric materials, films, current collectors, conductive films (e.g., copper or aluminum), foils, webs, strips of plastic material, metal, paper, or other materials. Typically, the terms "web," "foil," "strip," "substrate" and the like are used synonymously. In at least one example, the flexible substrate is a plastic substrate, such as, polypropylene and/or polyethylene. In another example, the flexible substrate has a film formed thereon, for example, a copper substrate having an anode film formed thereon. In another example, the flexible substrate is a copper substrate or an aluminum substrate. In yet another example, the flexible substrate is a plastic substrate coated with a thin layer of metal (e.g., polypropylene or polyethylene coated with copper). Examples of flexible substrates as described herein can include materials like polyethylene terephthalate (PET), Hard Coated PET (HC-PET), polyethylene (PE), polyimide (PI), polyurethane (PU), tantalum carbide (TaC), one or more metals, paper, combinations thereof, and already coated substrates like Hard Coated PET (e.g., HC-PET, HC-TAC) and the like.

According to some examples described herein, the direct deposition of low melting metal or metal alloys can be done either in vacuum conditions or suitable atmospheric ambient. According to some examples described herein, low melting temperature elements (e.g., melting temperature of 1,000 degrees Celsius or less, 800 degree Celsius or less; or 500 degree Celsius or less) that can be deposited using the implementations described herein are alkali metal (e.g., lithium and sodium), alkaline earth metals (e.g., magnesium), zinc, cadmium, aluminum, gallium, indium, thallium, tin, lead, antimony, bismuth, silver, and tellurium. In one example, the low melting temperature metal is selected from the group consisting of alkali metals, magnesium, zinc, cadmium, aluminum, gallium, indium, thallium, tin, lead, antimony, bismuth, and tellurium, alkali earth metals, silver, or a combination thereof.

According to some examples described herein, a "roll" or a "roller" can be understood as a device, which provides a surface, with which a substrate (or a part of a substrate) can be in contact during the presence of the substrate in the processing system. At least a part of the "roll" or "roller" as referred to herein can include a circular-like shape for contacting the substrate to be processed or already processed. In some implementations, the "roll" or "roller" can have a substantially cylindrical shape. The substantially cylindrical shape can be formed about a straight longitudinal axis or can be formed about a bent longitudinal axis. According to some implementations, the "roll" or "roller" as described herein can be adapted for being in contact with a flexible substrate. For example, a "roll" or "roller" as referred to herein can be a guiding roller adapted to guide a substrate while the substrate is processed (such as during a deposition process) or while the substrate is present in a processing system; a spreader roller adapted for providing a defined tension for the substrate to be coated; a deflecting roller for deflecting the substrate according to a defined travelling path; a processing roller for supporting the substrate during processing, such as a process drum, e.g. a coating roller or a coating drum; an adjusting roller, a supply roll, a take-up roll or the like. The "roll" or "roller" as described herein can include a metal. In one implementation, the surface of the roller device, which is to be in contact with the substrate can be adapted for the respective substrate to be coated. Further, it is to be understood that according to some implementations, the rollers as described herein can be mounted to low friction roller bearings, particularly with a dual bearing roller architecture. Accordingly, roller parallelism of the transportation arrangement as described herein can be achieved and a transverse substrate "wandering" during substrate transport can be eliminated.

Increasing deposition rate while decreasing substrate residence time can cause wrinkles and defects in thin metal substrates. Some substrates are temperature sensitive and deposition on temperature sensitive substrates is typically slow in order to reduce the thermal load impact on the substrate. Thus, decoupling thermal heat load and deposition rate helps increase the throughput of deposition processes on temperature sensitive substrates, especially for high-volume manufacturing. In some implementations of the present disclosure, molten metal or metal alloy is deposited directly on a cold casting drum. The molten metal undergoes rapid solidification (e.g., at a rate of one million degrees per second). The solidified metal or metal alloy is then transferred using a cold transfer process to a substrate at low temperatures.

In some examples, the cold casting drum is coated with a transfer liquid prior to deposition of the molten metal or metal alloy on the casting drum. The transfer liquid prevents the deposited metal or metal alloy from sticking to the cold surface of the casting drum thus improving ease of transfer of the solidified molten metal or metal alloy onto the substrate. In one example, the transfer liquid is a low vapor pressure and/or alkali metal compatible ionic liquid. The transfer liquid can be applied to the casting drum via a roller coating process. After application of the heat transfer liquid to the casting drum, the molten metal or metal alloy can be deposited on the heat transfer layer via a deposition process. After solidification, the solidified metal or metal alloy is then transferred to the substrate by the casting drum. In one example, the metal or metal alloy is lithium and the substrate is a flexible substrate, for example, a lithium-ion anode, a metallized plastic substrate, a copper current collector, or a combination thereof.

In another example, after application of the transfer liquid to the casting drum, a surface protection layer forming liquid is applied to the casting drum. The surface protection layer forming liquid rapidly solidifies to form a surface protection layer over the layer of transfer liquid. The molten metal or metal alloy is then deposited on the surface protection layer via a deposition process, for example, a spray coating process. After solidification, the solidified metal or metal alloy and the protection layer are then transferred to the substrate by the casting drum. The solidified metal or metal alloy and the protection layer are transferred by the casting drum in the reverse order of their deposition. For example, the solidified metal or metal alloy contacts the substrate with the protection layer formed on the solidified metal or metal alloy layer. In one example, the metal or metal alloy is lithium, the substrate is a flexible substrate, for example, a lithium-ion anode, a metallized plastic substrate, a copper current collector, or a combination thereof, and the protection layer is a surface protection layer such as LiF, $BiTe_3$, Cu, Sn, $LiNO_3$, sulfide, or a combination thereof.

Examples of deposition processes that can be used with the implementations described herein include but are not limited to sputtering, evaporation (e.g., thermal or e-beam), direct liquid application (e.g., slot-die coating, comma bar coating, Meyer rod coating, planar flow melt-spin, casting nozzle coating, or roller coating) and/or spray coating processes (e.g., subsonic spraying, electrostatic spraying, gas pressure spraying, thermal spraying, and plasma spraying).

Examples of surface protection films that can be formed using the implementations described herein include but are not limited to at least one or more of a lithium fluoride (LiF) film; a dielectric or ceramic film (e.g., oxides of titanium (Ti), aluminum (Al), niobium (Nb), tantalum (Ta), zirconium (Zr), or a combination thereof); one or more metal film(s) (e.g., tin (Sn), antimony (Sb), bismuth (Bi), gallium (Ga), germanium (Ge), copper films, silver films, gold films, or a combination thereof); a copper chalcogenide film (e.g., CuS, $Cu_2Se$, $Cu_2S$); a bismuth chalcogenide film (e.g., $Bi_2Te_3$, $Bi_2Se_3$); a tin chalcogenide film (e.g., SnTe, SnSe, $SnSe_2$, SnS), a gallium chalcogenide film (e.g., GaS, $Ga_2S_3$, GaSe, $Ga_2Se_3$, GaTe), a germanium chalcogenide film (GeTe, GeSe, GeS), an indium chalcogenide film (e.g., InS, $In_6S_7$, $In_2S_3$, InSe, $InS_4Se_3$, $In_6Se_7$, $In_2Se_3$, InTe, $In_4Te_3$, $In_3Te_4$, $In_7Te_{10}$, $In_2Te_3$, $In_2Te_5$), a silver chalcogenide film ($Ag_2Se$, $Ag_2S$, $Ag_2Te$), boron nitride, lithium nitrate, lithium borohydride, and a combination thereof; and a carbon-containing film. In some examples, the one or more surface protection film(s) are ion-conducting films. In some examples, the one or more surface protection film(s) are permeable to at least one of lithium ions and lithium atoms. The one or more surface protection film(s) provide surface protection of the metal or metal alloy film, which allows for handling of the metal or metal alloy film in a dry room.

Examples of transfer liquids that can be used with the implementations described herein include but are not limited to ionic liquids and heat transfer fluids (e.g., synthetic oils, mineral oils, and molten salts). Examples of oils that can be used with the implementations described herein include but are not limited to synthetic hydrocarbons, silicones, hydrocarbons, aromatic oils, paraffinic oils, and alkylated aromatic oils. Examples of synthetic oils that can be used with the implementations described herein include but are not limited to Therminol® VP-1 (FRAGOL AG), which is a eutectoid mixture of 73.5 wt. % biphenyl ether and 23.5 wt. % biphenyl with a melting point of 12 degrees Celsius, Therminol® D12 (FRAGOL AG), Diphyle® (Bayer A.G.), Dowtherm® (Dow Chemical), Therm® S300 (Nippon Steel), Fragoltherm® F-12 (FRAGOL AG), Paratherm™ LR Low Range Heat Transfer Fluid (plastiXs®), Paratherm™ NF Heat Transfer Fluid (plastiXs®). Examples of mineral oils that can be used with the implementations described herein include but are not limited to Caloria HT 43. Examples of molten salts that can be used with the implementations described herein include but are not limited to nitrate-based molten salts (e.g., $NaNO_3$, $KNO_3$, $NaNO_2$, and $Ca(NO_3)_3$), chloride-based molten salts (e.g., KCl—$MgCl_2$), and fluoride-based molten salts (e.g., LiF—NaF—KF). Examples of ionic liquids that can be used with the implementations described herein include but are not limited to N, N-diethyl-N-methyl-N-(2-methoxyethyl)ammonium $[DEME]^+$, Bis(fluorosulfonyl)imide $[FSI]^-$, N-methyl-N-alkyl pyrrolidinium $[C_n mpyr]$, N-methyl-N-propylpyrrolidinium Bis(trifluoromethanesulfonyl)amide $[C_3 mpyr\ TFSI]$, N-methyl-N-propylpyrrolidinium Bis(trifluoromethanesulfonyl)imide $[C_3 mpyr\ FSI]$, Bis(trifluoromethanesulfonyl)amide $[NTf_2]^-$, N-methyl-N-alkyl piperidinium $[C_n mpip]^+$, N-methyl-N-propylpiperidinium Bis(trifluoromethanesulfonyl)amide $[C_3 mpip\ TFSI]$, N-butyl-N-methylpyrrolidinium dicyanamide $[C_4 mpyr][DCA]$, N-methyl-butylpyrrolidinium tetracyanoborate $[C_4 mpyr\ TCB]$, Tetrafluoroborate $[BF_4]^-$, 1,2-dialkyl methylimidazolium $[C_n C_n mim]^+$, Dycyanamide $[dca]^-$, imide-based ionic liquids (e.g., bis(trifluoromethanesulfonyl)imide $(TFSI^-)$, bis (fluorosulfonyl)imide $(FSI^-)$, N-butyl-N-methylpyrrolidinium bis(trifluoromethanesulfonyl)imide $(PYR_{14}TFSI)$ or N-butyl-N-methylpyrrolidinium bis(fluorosulfonyl)imide $(PYR_{14}FSI)$, 1-ethyl-3-methylimidazolium bis(trifluoromethylsulfonyl)imide [EMI][TFSI]), and polymerized ionic liquid block copolymers (e.g., poly(styrene-b-ethylene oxide) (PS-PEO)/[EMI][TFSI] solutions). Examples of ionic liquids (cationic) that can be used with the implementations described herein include quaternary ammonium, imidazolium, pyrrolidinium, piperidinium, hexatrimethyl phosphonium, triethylsulfonium, which contain N, P, or S. Examples of ionic liquids (anionic) that can be used with the implementations described herein include N,N-bis(trifluoromethane)-sulphonamide (TFSI), bis(fluorosulphonyl)imide (FSI), tetrafluoroborate (BF4) and hexafluorophosphate (PF6), and N-butyl-N-methyl pyrrolidinium bis(trifluoromethanesulfonyl)-imide (Py14-TFSI).

Examples of solid electrolyte formation materials that can be used with the implementations described herein include vinyl carbonate (VC), fluorinated vinyl carbonate (FEC), fluorinated vinyl cyclosiloxanes, fluorinated sulfones, tri (hexafluoroisophosphate) (HFiP), Tris(pentafluorophenyl) phosphine (TPFPP), Biphenyl, 3,4 ethylenedioxythiophene (EDT), biphenyl, cyclohexylbenzene, Cyclohexylbenzen (CHB), 1,3-propanesultone (PS), 1-methyl-1,3-propanesultone, 2-methyl-1,3 propanesultone, 3-methyl-l, 3-propanesultone, 1-ethyl-1,3-propanesultone, succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, siloxane backbone to poly-ethylene oxide, o-terphenyl, triphenylene, cyclohexylbenzene, biphenyl, 1,3 propane sulfonate, N-butyl-N-methyl pyrrolidinium bis(trifluoromethanesulfonyl)-imide (Py14-TFSI), Poly acrylonitrile (PAN), Poly methyl methacrylate (PMMA), and PVDF.

FIG. 1 illustrates a schematic cross-sectional view of one example of a flexible layer stack 100 formed according to one or more implementations described herein. The flexible layer stack 100 shown in FIG. 1 includes a flexible substrate 110, a first layer 120a, 120b (collectively 120), and a second layer 130a, 130b (collectively 130). Although the flexible layer stack 100 is shown in FIG. 1 as having five layers, it will be understood by those of ordinary skill in the art that the flexible layer stack 100 can include a greater or smaller number of layers, which can be provided over, under and/or between the flexible substrate 110, the first layer 120, and/or the second layer 130 shown in FIG. 1. Although shown as a double-sided structure, it will be understood by those of ordinary skill in the art that the flexible layer stack can also be a single-sided structure with the flexible substrate 110, the first layer 120, and the second layer 130.

According to some examples described herein, the flexible substrate 110 can include a first material, and/or the first layer 120 can include a second material. Further, the second layer 130 can include a third material. For instance, the first material can be a conductive material, typically a metal, such as copper (Cu) or nickel (Ni). Furthermore, the flexible substrate 110 can include one or more sub-layers. The second material can be a low melting temperature metal, for example, an alkali metal, such as lithium. The third material can be a protective film or interleaf film operable to protect the low melting temperature metal.

According to some examples described herein, the flexible substrate 110 can have a thickness equal to or less than about 25 µm, typically equal to or less than 20 µm, specifically equal to or less than 15 µm, and/or typically equal to or greater than 3 µm, specifically equal to or greater than 5

µm. The flexible substrate 110 can be thick enough to provide the intended function and can be thin enough to be flexible. Specifically, the flexible substrate 110 can be as thin as possible so that the flexible substrate 110 can still provide its intended function.

According to some examples described herein, the first layer 120 can have a thickness of equal to or less than 10 µm, typically equal to or less than 8 µm, beneficially equal to or less than 7 µm, specifically equal to or less than 6 µm, in particular equal to or less than 5 µm. According to some example, the thickness of the first layer 120 can be equal to or less than 4 µm, or equal to or less than 3 µm, or equal to or less than 2 µm.

According to some examples described herein, the second layer 130 can have a thickness of equal to or less than 10 µm, typically equal to or less than 8 µm, beneficially equal to or less than 7 µm, specifically equal to or less than 6 µm, in particular equal to or less than 5 µm. According to some example, the thickness of the second layer 130 can be equal to or less than 4 µm, or equal to or less than 3 µm, or equal to or less than 2 µm.

The flexible layer stack 100 shown in FIG. 1 can be, for example, a negative electrode of/for a secondary cell, such as a negative electrode or anode of/for a lithium battery. According to some examples described herein, a flexible negative electrode for a lithium battery includes a flexible substrate 110 that can be a current collector including copper and having a thickness of equal to or less than 10 µm, typically equal to or less than 8 µm, beneficially equal to or less than 7 µm, specifically equal to or less than 6 µm, in particular equal to or less than 5 µm. The flexible negative electrode further includes a first layer 120 including lithium and having a thickness of equal to or more than 5 µm and/or equal to or less than 15 µm and a second layer 130 including a protective film having a thickness of equal to or more than 5 µm and/or equal to or less 15 µm.

Figure 2:
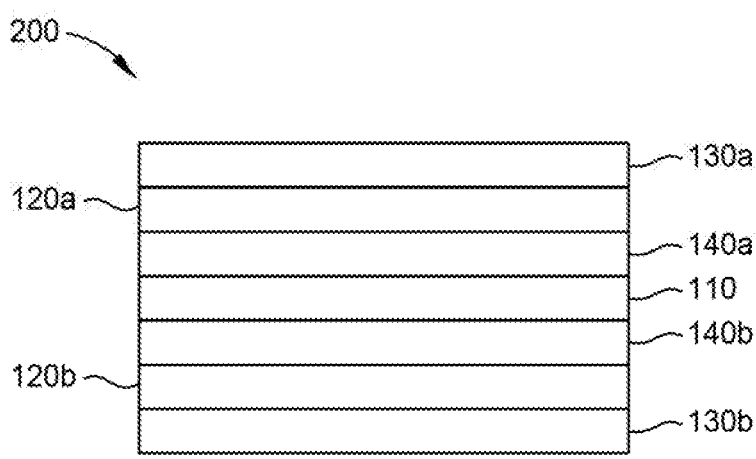
FIG. 2 is illustrates a schematic cross-sectional view of another example of a flexible layer stack formed according to one or more implementations described herein.

FIG. 2 illustrates a schematic cross-sectional view of another example of a flexible layer stack 200 formed according to one or more implementations described herein. The flexible layer stack 200 is similar to the flexible layer stack 100 depicted in FIG. 1. The flexible layer stack 200 further includes a third layer 140a, 140b (collectively 140) sandwiched in between the flexible substrate 110 and the first layer 120. The third layer 140 can include a fourth material. The third layer 140 can have a thickness from about 10 µm to about 200 µm (e.g., from about 1 µm to about 100 µm; from about 10 µm to about 30 µm; from about 20 µm to about 30 µm; from about 1 µm to about 20 µm; or from about 50 µm to about 100 µm). The fourth material can include an anode material constructed from graphite, silicon, silicon-containing graphite, lithium metal, lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or a combination thereof. The fourth material can further include a binder material. For instance, the first material can be a conductive material, typically a metal, such as copper (Cu) or nickel (Ni). The fourth material can be graphite, silicon, or silicon-containing graphite. The second material can be a low melting temperature metal, for example, an alkali metal, such as lithium. The third material can be a protective film or interleaf film operable to protect the low melting temperature metal.

Figure 3:
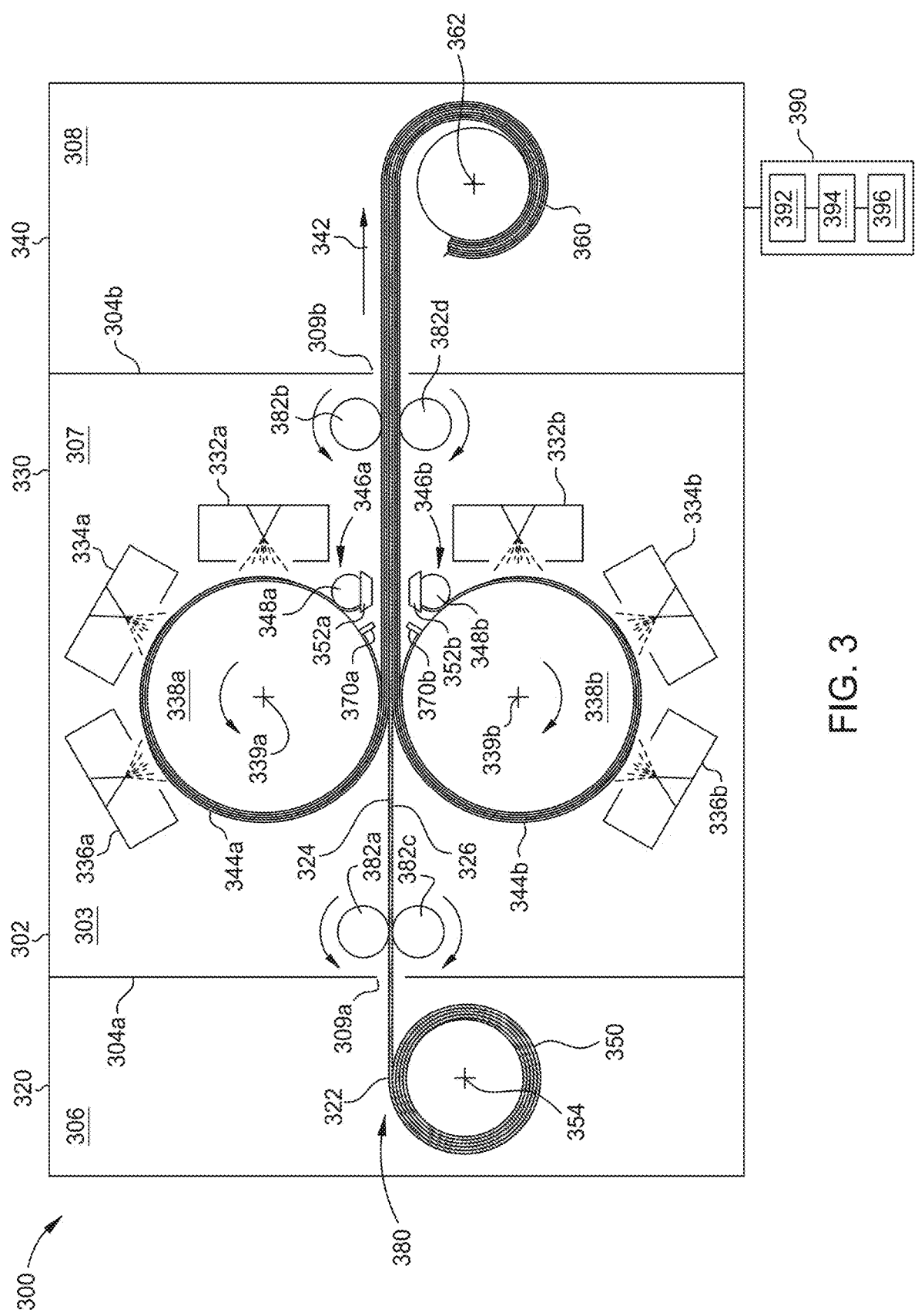
FIG. 3 illustrates a schematic side view of one example of an apparatus for manufacturing a flexible layer stack according to one or more implementations described herein.

FIG. 3 illustrates a schematic side view of one example of a molten metal coating system 300 for manufacturing a flexible layer stack according to one or more implementations described herein. The molten metal coating system 300 can be used to form a flexible layer stack, for example, the flexible layer stack 100 or the flexible layer stack 200. The molten metal coating system 300 includes a molten metal coating module 330 according to one or more implementations described herein. The molten metal coating system 300 further includes an unwinding module 320 operable to supply a flexible substrate such as a continuous flexible substrate 322 to the molten metal coating module 330. The molten metal coating module 330 further includes a winding module 340 operable to collect the flexible substrate from the molten metal coating module 330. The molten metal coating system 300 can be operable for either single-sided or double-sided processing of a flexible substrate. In some implementations, the molten metal coating system 300 is operable for depositing molten metal (e.g., molten lithium) on flexible substrates followed by forming a passivation film or a protective film on the as deposited molten metal.

The molten metal coating system 300 can include any suitable structure, configuration, arrangement, and/or components that enable the molten metal coating system 300 to deposit molten metal and/or passivate the deposited molten metal on the continuous flexible substrate 322 according to implementations of the present disclosure. For example, in some implementations the molten metal coating system 300 includes, but is not limited to, suitable deposition systems including casting rollers, sprayers, evaporators, air bearings, power sources, individual pressure controls, deposition control systems, load cells, servomotors, and temperature control components.

The molten metal coating system 300 includes a chamber body 302. The chamber body 302 can be fabricated from standard materials, such as aluminum, quartz, ceramic, or stainless steel. The chamber body 302 can be cooled by a fluid such as, for example, water and/or a glycol-based fluid. The chamber body 302 defines an interior volume 303. Partition plates 304a, 304b (collectively 304) extend across the interior volume 303 defined by the chamber body 302. The partition plate 304a separates the interior volume 303 into an unwinding volume 306 operable to supply the continuous flexible substrate 322 and a processing volume 307 in which molten metal is deposited on the continuous flexible substrate 322. The partition plate 304b separates the interior volume 303 into the processing volume 307 and a winding volume 308 operable to collect the processed continuous flexible substrate 322. The partition plates 304a, 304b include one or more through-holes 309a, 309b (collectively 309) respectively for accommodating the continuous flexible substrate 322. Each through-hole 309 in the partition plate 304 is sized to accommodate the continuous flexible substrate 322 while enabling differential pumping between the unwinding volume 306, the processing volume 307, and/or the winding volume 308.

In one implementation, the chamber body 302 defines a vacuum chamber. In another implementation, in case of non-vacuum deposition techniques, such as roller coating and slot-die coating, a chamber of a dry room or a glove box, can be used.

In some implementations, an inert gas environment is maintained in at least one of the unwinding volume 306, the processing volume 307, and/or the winding volume 308. The inert gas environment can include an inert gas selected from argon, nitrogen, or combinations of argon and nitrogen. The inert gas environment of the unwinding volume 306, the processing volume 307, and/or the winding volume 308 isolates (e.g., provides gas separation) from the substantially ambient (e.g., atmospheric) environment outside of the molten metal coating system 300, which reduces the likelihood of contamination of the as deposited lithium film. This inert gas environment of the unwinding volume 306, the processing volume 307, and/or the winding volume 308 also isolates (e.g., provides gas separation) the unwinding volume 306 from the processing volume 307 and the processing volume 307 from the winding volume 308, if desired. This isolation enables use of incompatible chemistries in the unwinding volume 306, the processing volume 307, and/or the winding volume 308. In one example, the processing volume 307 contains an argon gas environment and the winding volume 308 contains a combination of argon and a passivation gas (e.g., nitrogen).

In some implementations, at least one of the unwinding volume 306, the processing volume 307, and the winding volume 308 is coupled to a pressure control system (not shown), which pumps down and vents the unwinding volume 306, the processing volume 307, and/or the winding volume 308 as needed to facilitate passing the continuous flexible substrate 322 between the inert gas environment and the substantially ambient (e.g., atmospheric) environment outside of the molten metal coating system 300.

The chamber body 302 includes one or more openings (not shown) for providing access to the interior volume 303. In one example, the one or more openings are positioned at a top of the chamber body 302. The one or more openings can be positioned at other locations of the chamber body 302, which provide access to the chamber components. The chamber body 302 can optionally include a lid (not shown) that can open and close to allow the user access to components within the interior volume 303 of the chamber body 302. In one example, the chamber body 302 includes transparent portions or windows used to monitor processing conditions within the chamber.

It should be understood that although the unwinding volume 306, the processing volume 307, and the winding volume 308 are shown as sharing a common chamber body 302, in some implementations, the unwinding volume 306, the processing volume 307, and the winding volume 308 are defined by separate chamber bodies with the chamber body defining the unwinding volume 306 stacked upon or adjacent to (e.g., side-by-side) the chamber body defining the processing volume 307, and/or the winding volume 308. For example, in some implementations, the molten metal coating system 300 includes an unwinding chamber, which defines the unwinding volume 306, a deposition chamber, which defines the processing volume 307, and a separate winding chamber, which defines the winding volume 308. The unwinding chamber, the deposition chamber, and the winding chamber are separate modular and stackable elements. In one example, the unwinding chamber is positioned adjacent to one side of the deposition chamber and the winding chamber is positioned adjacent to the opposing side of the deposition chamber.

The molten metal coating system 300 is constituted as a roll-to-roll system including the unwinding module 320 operable to supply the continuous flexible substrate 322, the molten metal coating module 330 operable to deposit molten metal on the continuous flexible substrate 322, and the winding module 340 operable to form a passivation film and/or protective film on the molten metal in the winding module 340. The unwinding module 320 includes an unwinding roller 350 operable to supply the continuous flexible substrate 322. The winding module 340 includes a winding roller 360 operable to accept the processed continuous flexible substrate 322. In some implementations, the molten metal coating system 300 can further include a laminate film supply roller (not shown) operable to supply a protective film to the processed continuous flexible substrate 322.

The continuous flexible substrate 322 is provided as a web, which is wound up on a roll, such as the unwinding roller 350. In one example, the continuous flexible substrate 322 has a width in a range from 15 cm to 300 cm, and typically has a width of approximately 160 cm. In addition, the continuous flexible substrate 322 has a thickness in a range from 8 µm to 200 µm, for example, a thickness of approximately 50 µm. The continuous flexible substrate 322 has a front surface 324 and a back surface 326. In one implementation, after processing, the continuous flexible substrate 322 includes a flexible material having a lithium electrode structure and a passivation film formed thereon. For example, after processing, the continuous flexible substrate 322 can be the flexible substrate 110, for example, a negative current collector, having the first layer 120, for example, a negative electrode structure, and a second layer 130, for example, a protective film, formed thereon as shown in FIG. 1. In one example, only the front surface 324 of the flexible substrate has a lithium film and a protective film formed thereon. In another example, both the front surface 324 and the back surface 326 have metal films and passivation films formed thereon.

In another implementation, after processing, the continuous flexible substrate 322 includes a flexible material having a lithiated electrode structure and a passivation film formed thereon. For example, after processing, the continuous flexible substrate 322 can be the flexible substrate 110, for example, a negative current collector, having the third layer 140, for example, a negative electrode structure formed on the flexible substrate 110, a first layer 120, for example, a lithium film formed on the third layer 140, and a second layer 130, for example, a protective film, formed on the first layer 120 as shown in FIG. 2. In one example, only the front surface 324 of the flexible substrate has a lithium film and a surface protection film formed thereon. In another example, both the front surface 324 and the back surface 326 have metal films and passivation films formed thereon.

The molten metal coating system 300 further includes a common transport architecture 380. The common transport architecture 380 can include any transfer mechanism capable of moving the continuous flexible substrate 322 through the unwinding volume 306, the processing volume 307, and the winding volume 308. In some implementations, the common transport architecture 380 is a reel-to-reel system including the unwinding roller 350 and the winding roller 360. The unwinding roller 350 and the winding roller 360 can be independently heated or cooled depending upon the targeted process conditions. The unwinding roller 350 can be driven and rotary by a motor 354. The winding roller 360 can also be driven and rotary by a motor 362. The unwinding roller 350 and the winding roller 360 can be individually heated using an internal heat source positioned within each reel or an external heating source. The unwinding roller 350 and the winding roller 360 can be individually cooled using either an internal cooling source positioned within each reel or an external cooling source.

In some implementations, the common transport architecture 380 further includes one or more auxiliary tension reels 382a-382d (collectively 382) positioned between the unwinding roller 350 and the winding roller 360. The auxiliary tension reels are disposed on a travel path 342 where the continuous flexible substrate 322 is conveyed between the unwinding roller 350 and the winding roller 360, to allow a tensile force to the continuous flexible substrate 322. This tensile force prevents the continuous flexible substrate 322 from sagging down as well as to change the movement direction of the continuous flexible substrate 322. Accordingly, even though the continuous flexible substrate 322 is moved along a continuously long path, a certain movement rate is constantly maintained. In some implementations, any of the auxiliary tension reels 382 can be replaced with gas cushion rollers. The auxiliary tension reels 382 can be individually heated either using an internal heat source positioned within each reel or an external heat source. The auxiliary tension reels 382 can be individually cooled using either an internal cooling source positioned within each reel or an external cooling source. The auxiliary tension reels 382 can provide at least one functionality selected from guiding the continuous flexible substrate 322, tensioning the continuous flexible substrate 322, charging the continuous flexible substrate 322, decharging the continuous flexible substrate 322, and heating or cooling the continuous flexible substrate 322. The auxiliary tension reels 382 can include one or more servomotors for advancing the continuous flexible substrate 322. The one or more servomotors allow for precise control of linear position, velocity, and/or acceleration of the continuous flexible substrate 322. The one or more servomotors can be coupled with a sensor for position feedback.

The common transport architecture 380 can further include one or more servomotors for advancing the continuous flexible substrate 322 and/or one or more load cells for converting web tension into an electrical signal that can be measured and standardized.

Generally, the molten metal coating system 300 includes a system controller 390 operable to control the automated aspects of the molten metal coating system 300. The system controller 390 can be provided and coupled to various components of the molten metal coating system 300 to control the operation thereof. The system controller 390 includes a central processing unit (CPU) 392, a memory 394, and support circuits 396. The system controller 390 can control the molten metal coating system 300 directly, or via computers (or controllers) associated with particular process chamber and/or support system components. The system controller 390 can be one of any form of general-purpose computer processor that can be used in an industrial setting for controlling various chambers and sub-processors. The memory, or computer readable medium, 394 of the system controller 390 can be one or more of readily available memory such as random access memory (RAM), read only memory (ROM), floppy disk, hard disk, optical storage media (e.g., compact disc or digital video disc), flash drive, or any other form of digital storage, local or remote. The support circuits 396 are coupled to the CPU 392 for supporting the processor in a conventional manner. These circuits include cache, power supplies, dock circuits, input/output circuitry and subsystems, and the like. The methods as described herein can be stored in the memory 394 as software routine that can be executed or invoked to control the operation of the molten metal coating system 300 in the manner described herein. The software routine can also be stored and/or executed by a second CPU (not shown) that is remotely located from the hardware being controlled by the CPU 392. In one example, the system controller 390 is operable to control the travel rate of the continuous flexible substrate 322 by monitoring load cells and controlling the servomotors in the auxiliary tension reels 382.

In operation, the continuous flexible substrate 322 is conveyed from the unwinding roller 350 advancing into the molten metal coating module 330. The continuous flexible substrate 322 travels from the unwinding volume 306 through through-hole 309a, advancing into the processing volume 307 of the molten metal coating module 330. In the processing volume 307, the continuous flexible substrate 322 is exposed to a coating process to deposit a molten metal film on the continuous flexible substrate 322 and optionally a surface protection film on the molten metal film. The continuous flexible substrate 322 travels through through-hole 309b, advancing from the processing volume 307 into the winding volume 308. In the winding volume 308, the processed continuous flexible substrate 322 is wound on the winding roller 360.

Turning to the molten metal coating module 330, the molten metal coating module 330 includes one or more processing stations operable to process the continuous flexible substrate 322. For instance, a first deposition source arrangement 332a, 332b (collectively 332) operable to deposit a first layer including a first material over the continuous flexible substrate 322 can be provided. Further, a second deposition source arrangement 334a, 334b (collectively 334) operable to deposit a second layer including a second material over the first layer can be provided. Furthermore, a third deposition source arrangement 336a, 336b (collectively 336) operable to deposit a third layer including a third material over the second layer can be provided.

For instance, the first deposition source arrangement 332 can be configured to deposit a surface protection film. The second deposition source arrangement 334 can be configured to deposit either a surface protection film or an alkali metal, such as lithium. The third deposition source arrangement 336 can be configured to deposit an alkali metal, such as lithium.

According to examples described herein, each of the first deposition source arrangement 332, the second deposition source arrangement 334 and the third deposition source arrangement 336 can include one or more deposition sources. Examples of deposition sources include but are not limited to sputtering, evaporation (e.g., thermal or e-beam), direct liquid application (e.g., slot-die coating, comma bar coating, Meyer rod coating, planar flow melt-spin, casting nozzle coating, or roller coating) and/or spray coating processes (e.g., subsonic spraying, electrostatic spraying, gas pressure spraying, thermal spraying, and plasma spraying).

Specifically, the number of deposition sources per deposition source arrangement, such as the first deposition source arrangement 332, the second deposition source arrangement 334 and the third deposition source arrangement 336, can be adjusted according to the intended thickness of the layer formed by the respective deposition source arrangement. For instance, in case of a negative electrode for a lithium battery, it is desired to have thicker lithium layers than the surface protection film formed thereon. The second deposition source arrangement 334 can be configured for depositing lithium and include more deposition sources than first deposition source arrangement 332 configured for depositing the surface protection film. As exemplarily shown in FIG. 3, the first deposition source arrangement 332, the second deposition source arrangement 334, and the third deposition source arrangement 336 each include one deposition source.

The molten metal coating module 330 further includes a pair of rotatable casting drums 338a, 338b (collectively 338) positioned on opposing sides of the continuous flexible substrate 322. The casting drum 338 is a cylinder having a quench surface 344a, 344b (collectively 344) on which molten metal is deposited. The quench surface 344 is a curved surface. The quench surface 344 can be a smooth surface. The quench surface 344 includes at least one of stainless steel, copper, chromium, or a combination thereof. In one example, the quench surface 344 of the casting drum 338 is stainless steel. As further shown in FIG. 3, the casting drum 338 has a rotation axis, which is provided in the molten metal coating system 300. Each casting drum 338 can be driven and rotary by a motor 339a, 339b (collectively 339).

According to some examples described herein, the casting drum 338 can be heated or cooled to a desired processing temperature. A heating or cooling device within the casting drum 338 can be connected to a controller by a connection. According to typical examples described herein, the casting drum 338 can be heated or cooled for deposition purposes. In one example, the casting drum includes coolant channels operable to contain a coolant for cooling the quench surface 344 of the casting drum 338. The coolant channels can be coupled to a coolant source, which supplies a heat transfer fluid. The fluid can be water, ethylene glycol, nitrogen ($N_2$), helium (He), mixed hydrocarbon gases such as poly-cold, hydrocarbons such as Fragoltherm® F-12; Paratherm™ LR; Paratherm™ NF; mineral oil; Mobil oil; compressed $CO_2$, or any other fluid used as a heat-exchange medium. In another example, the casting drum 338 is cooled using an internal cooling source positioned within the casting drum 338. In yet another example, the casting drum 338 is cooled using an external cooling source. Further, the casting drum 338 can be cooled during deposition of, for example, a material having a low melting point such as lithium.

The molten metal coating module 330 further includes a peeling layer deposition source arrangement 346a, 346b (collectively 346) operable to deliver a transfer liquid to the quench surface 344 of the casting drum 338. The transfer liquid forms a peeling layer on the quench surface 344 of the casting drum 338. The peeling layer formed on the quench surface 344 prevents subsequently deposited layers from sticking to the quench surface 344. In one example, the peeling layer deposition source arrangement 346 is positioned adjacent to the casting drum 338 and prior to the first deposition source arrangement 332 in sequence such that the transfer liquid is deposited on the quench surface 344 prior to any material layers.

In one implementation, the peeling layer deposition source arrangement 346 includes a pick-up roller or kiss roller 348a, 348b (collectively 348). The kiss roller 348 picks up by contact a wet film including the transfer liquid from a transfer liquid source pool 352a, 352b (collectively 352) and delivers the transfer liquid to the quench surface 344 of the casting drum 338. The kiss roller 348 can further include a servomotor for driving and rotating the kiss roller 348.

In one example, the kiss roller 348 contacts the casting drum 338 while traveling in an anti-direction meaning that the kiss roller 348 rotates in a direction that is opposite the rotation direction of the casting drum 338 (i.e., contact in anti-direction). In another example, the kiss roller 348 does not contact the casting drum 338 while rotating in the same direction as the rotation direction of the casting drum 338 (i.e., contact-free in co-direction). In yet another example, the kiss roller 348 contacts the casting drum 338 while rotating in the same direction as the rotation direction of the casting drum 338 (i.e., contact in co-direction).

The molten metal coating module 330 further includes a removal arrangement 370a, 370b (collectively 370) for removing any material remaining on the casting drum 338 after delivering the material layers to the continuous flexible substrate 322 and prior to applying the peeling layer formation liquid to the casting drum 338. The removal arrangement includes any tool capable of cleaning the quench surface 344 of the casting drum 338. Example of tools that can be used include mechanical tools (e.g., a scraper), a fluid jet, and/or an air jet.

In operation, the casting drum 338 rotates through the following in sequence: the peeling layer deposition source arrangement 346, the first deposition source arrangement 332, the second deposition source arrangement 334, the third deposition source arrangement 336, and the removal arrangement 370. Even though it is often referred to herein as deposition source arrangements being the processing stations, also other processing stations, like etch stations, heating stations, etc. can be provided along the curved quench surface 344 of the casting drum 338. Accordingly, the molten metal coating system 300 described herein can have compartments for various deposition sources, allowing for a modular combination of several sputtering, evaporation, spraying, CVD, PECVD and/or PVD deposition sources in a single deposition apparatus.

Figure 4:
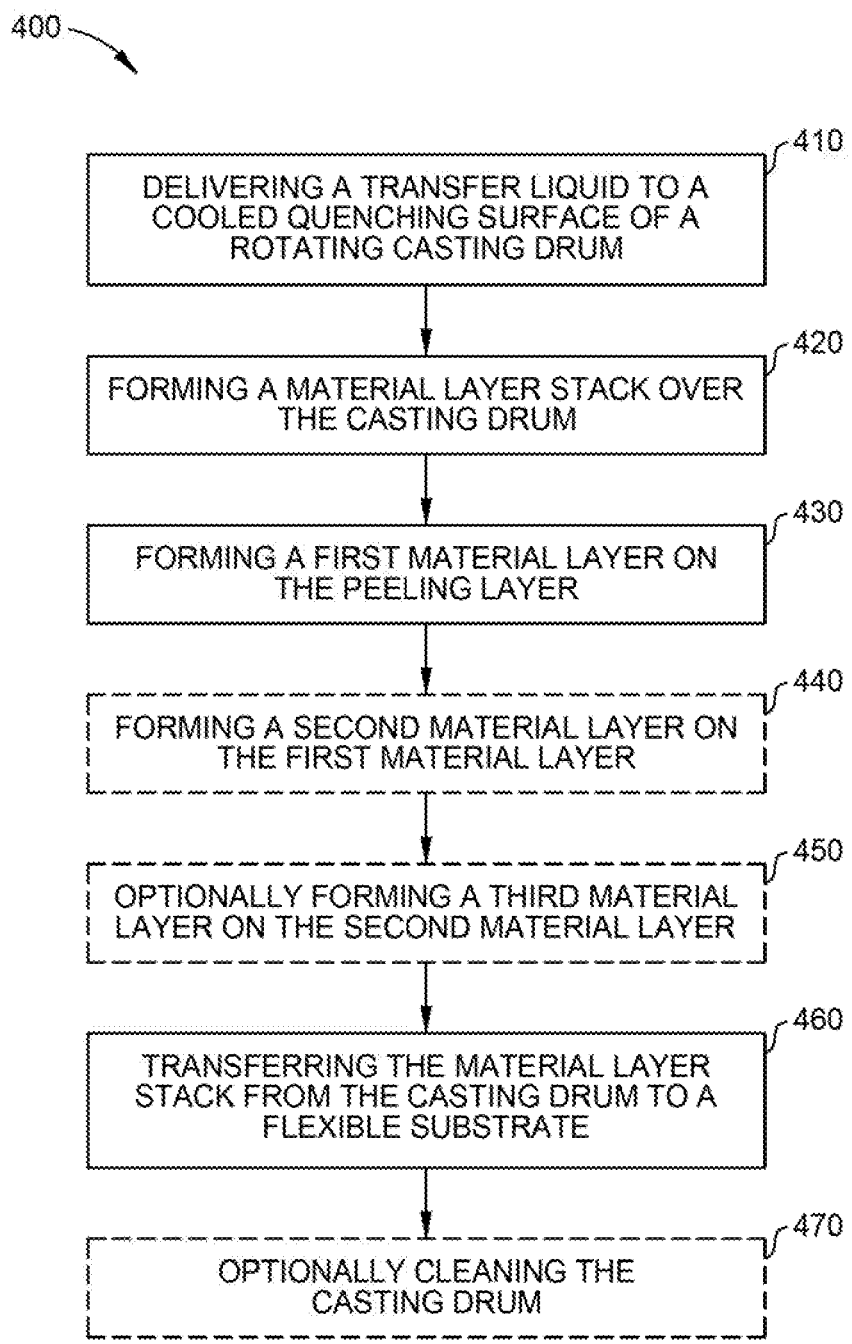
FIG. 4 illustrates a flowchart of a method for manufacturing a flexible layer stack according to one or more implementations described herein.

FIG. 4 illustrates a flowchart of a processing sequence 400 for manufacturing a flexible layer stack according to one or more implementations described herein. The processing sequence 400 can be used to form a single-sided flexible stack, for example, a double-sided flexible stack, for example, the flexible layer stack 100 depicted in FIG. 1 or the flexible layer stack 200 depicted in FIG. 2. The processing sequence 400 can be performed using, for example, the molten metal coating system 300 depicted in FIG. 3.

The processing sequence 400 includes, according to operation 410, delivering a transfer liquid to a cooled quenching surface of a rotating casting drum. With reference to FIG. 3, the transfer liquid can be applied to the casting drum 338 by kiss roller. The transfer liquid can solidify on the quench surface 344 of the casting drum 338 to form a peeling layer. The peeling layer formed on the cooled quench surface prevents subsequently deposited layers from sticking to the quench surface. For example, if the subsequently deposited layer is a sticky material such as lithium, the peeling layer prevents lithium from sticking to the quenching surface. The transfer liquid is selected to be compatible with both the cooled quenching surface and the subsequently deposited layer.

At operation 420, a material layer stack is formed on the peeling layer, if present or directly on the quenching surface of the casting drum if the peeling layer is not present. At operation 430, a first material layer of the material layer stack is formed on the peeling layer (if present). In one example, the first material layer is a surface protection film, for example, lithium fluoride. In another example, the first material layer is a low melting temperature metal or metal alloy, for example, lithium. The first material layer can be deposited by the first deposition source arrangement 332. Optionally, at operation 440, a second material layer is formed on the first material layer. In one example, the second material layer is an additional surface protection film. In another example, the second material layer is a low melting temperature metal or metal alloy, for example, lithium. The second material layer can be deposited by the second deposition source arrangement 334. Optionally, at operation 450, a third material layer is formed on the second material layer. In one example, the third material layer is a low melting temperature metal or metal alloy, for example, lithium. The third material layer can be deposited by the third deposition source arrangement 336.

In one example, a surface protection layer forming liquid rapidly solidifies to form a surface protection layer over the layer of transfer liquid. The molten metal or metal alloy is then deposited on the surface protection layer via a deposition process, for example, a spray coating process. After solidification, the solidified metal or metal alloy and the protection layer are then transferred to the substrate by the casting drum at operation 460.

At operation 460, the material layer stack is transferred from the casting drum to a flexible substrate. The flexible substrate can be the continuous flexible substrate 322. In one example, the flexible substrate is a plastic substrate, such as, polypropylene and/or polyethylene. In another example, the flexible substrate has a film formed thereon, for example, a copper substrate having an anode film formed thereon. In another example, the flexible substrate is a copper substrate or an aluminum substrate. In yet another example, the flexible substrate is a plastic substrate coated with a thin layer of metal (e.g., polypropylene or polyethylene coated with copper). The layers of the material layer stack are transferred to the continuous flexible substrate in the reverse order of their deposition on the casting drum. For example, the solidified metal or metal alloy contacts the flexible substrate with the protection layer formed on the solidified metal or metal alloy layer. In one example, the metal or metal alloy is lithium, the substrate is a flexible substrate, for example, a lithium-ion anode, a metallized plastic substrate, a copper current collector, or a combination thereof, and the protection layer is a surface protection layer such as LiF, $BiTe_3$, Cu, Sn, $LiNO_3$, sulfide, or a combination thereof.

Optionally, at operation 470, the casting drum is exposed to a cleaning process. The cleaning process is performed to remove the peeling layer (if present) and any other contaminants from the quenching surface of the casting drum prior to repeating operations 410-460. The cleaning process can be performed using, for example, removal arrangement 370 for removing any material remaining on the casting drum after delivering the material layer stack to the continuous flexible substrate 322 and prior to applying/reapplying the transfer liquid to the casting drum 338. The cleaning process can be performed using any tool capable of removing contaminants from the quench surface of the casting drum. Examples of tools that can be used to clean the quench surface of the casting drum include mechanical tools (e.g., a scraper), a fluid jet, and/or an air jet.

Figure 5:
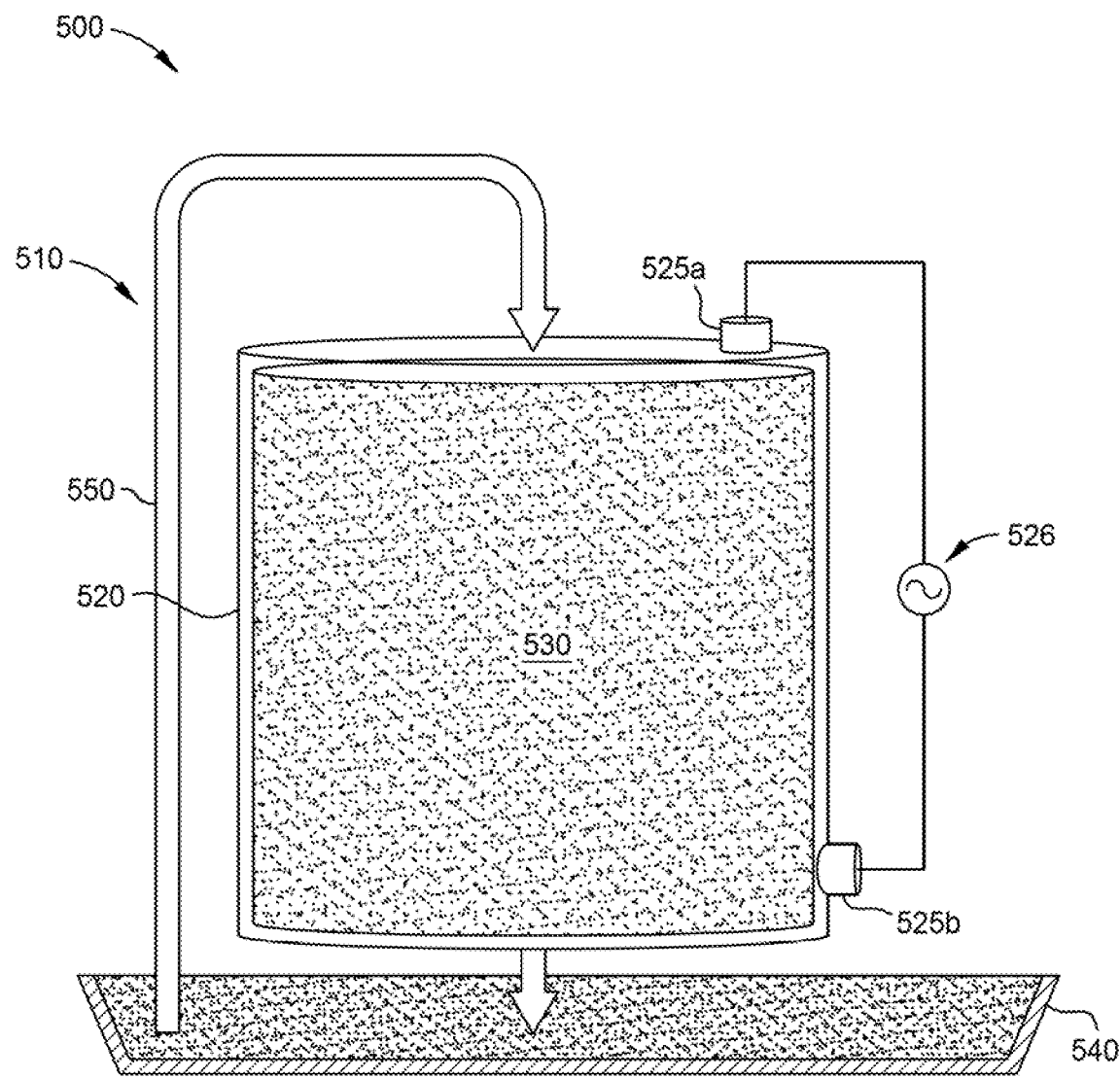
FIG. 5 illustrates a schematic side view of an evaporation apparatus according to one or more implementations of the present disclosure.

FIG. 5 illustrates a schematic side view of an evaporation apparatus 500 according to one or more implementations of the present disclosure. The evaporation apparatus 500 can be used as a deposition source, for example, in any of the deposition source arrangements 332, 334, and 336 depicted in FIG. 3. The evaporation apparatus includes dispenser 510. The dispenser 510 includes a container 520, which holds a porous material 530. The container 520 can be made of any material or shape compatible with the applications. The material of the container 520 should be chemically inert against the processing atmosphere and the molten metal at any temperature foreseen in use, which can exceed 1,000 degrees Celsius. Further, at the temperature of use the material forming the container 520 should not undergo substantial physical alterations, such as modifying either its mechanical strength or shape. Materials having these features are, for example, metals or metal alloys, a few ceramics or graphite. Employing metals or metal alloys provides ease of workability and formability. Another advantage of the use of metals or metal alloys is that the container can be heated simply by flowing current through the container 520 walls. Examples of metals and metal alloys that the container 520 can be composed of are molybdenum, tantalum, tungsten, nickel, steel and nickel-chromium or nickel-chromium-iron alloys.

The dispenser 510 has at its two ends, connections 525a, 525b, which are adapted for connection with electrical terminals for heating the dispenser 510 by direct current flow. The connections 525a, 525b are coupled with a power source 526 for supplying power to heat the dispenser 510 by direct current flow.

The container 520 defines a recess, which is filled with the porous material 530. The porous material 530 can be in the form of a mesh, for example, a nickel mesh. The porous material 530 can be in the form of a powder. Alternatively, the porous material 530 can be in the form of pellets. The porous material 530 can be in the form of a metal foam. The porous material 530 can be composed of nickel, molybdenum, a nickel-molybdenum alloy, or a combination thereof. Not to be bound by theory but it is believed that the increased surface area of the porous material, which is in direct contact with liquid lithium, wicks the molten lithium into the pores of the metal foam during evaporation, and avoids flash evaporation by containing evaporation within the pores and eliminate splash.

The evaporation apparatus 500 further includes a drip tray 540 for capturing excess molten metal from the dispenser 510. The drip tray 540 is fluidly coupled with a fluid line 550, which recirculates the molten metal from the drip tray 540 back into the dispenser 510.

In summary, some of the benefits of the present disclosure include the efficient integration of molten metal deposition and lamination into a modular processing system. In addition, increased deposition rate of molten materials on thin temperature sensitive substrate with a reduction in wrinkles and pattern formation on the temperature sensitive substrate is achieved by decoupling thermal heat load from deposition rate. Decoupling thermal heat load from deposition rate is achieved by depositing the molten material on a cooled casting drum. The molten metal undergoes rapid solidification (e.g., at a rate of one million degrees per second). The solidified molten material is then transferred at a cooled temperature onto the temperature sensitive substrate using a cold transfer process. Thus, the temperature sensitive substrate is not exposed to the high temperature of the molten material since the molten material is solidified and cooled prior to contacting the continuous flexible substrate. Furthermore, additional layers, for example, protective layers can be formed on the casting drum and deposited on the continuous flexible substrate along with the solidified metal or metal alloy layer.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there can be additional elements other than the listed elements.

While the foregoing is directed to implementations of the present disclosure, other and further implementations of the present disclosure can be devised without departing from the basic scope thereof, and the scope thereof is determined by the claims that follow.

The invention claimed is:

1. A method, comprising:
    delivering a transfer liquid to a quenching surface of a rotating casting drum, wherein the transfer liquid forms a peeling layer on the quenching surface of the rotating casting drum;
    forming a material layer stack over the rotating casting drum, comprising:

forming a surface protection film on the peeling layer prior to delivering a molten metal or molten metal alloy toward the quenching surface of the rotating casting drum; and delivering the molten metal or molten metal alloy toward the quenching surface of the rotating casting drum; and transferring the material layer stack from the rotating casting drum to a continuous flexible substrate, wherein the quenching surface of the rotating casting drum is cooled to a temperature at which the layers of the material layer stack solidify.

2. The method of claim 1, wherein the transfer liquid is selected from ionic liquids, synthetic oils, mineral oils, molten salts, or a combination thereof.

3. The method of claim 1, wherein the transfer liquid is applied to the casting drum via a roller coating process.

4. The method of claim 1, wherein forming the surface protection film comprises delivering a protection layer forming liquid toward the quenching surface, which solidifies on the peeling layer to form the surface protection film.

5. The method of claim 1, wherein the surface protection film is selected from LiF, $BiTe_3$, Cu, Sn, $LiNO_3$, sulfide, or a combination thereof.

6. The method of claim 1, wherein the continuous flexible substrate is a copper substrate and the molten metal is lithium.

7. The method of claim 1, wherein the continuous flexible substrate is a copper substrate having an anode film formed thereon and the molten metal is lithium.

8. A method, comprising:
delivering an ionic liquid to a quenching surface of a rotating casting drum, wherein the quenching surface is cooled to a temperature at which the ionic liquid solidifies to form a peeling layer on the rotating casting drum;

forming a material layer stack over the rotating casting drum, comprising:
forming a surface protection layer over the rotating casting drum and on the peeling layer; and
delivering a molten lithium metal onto the surface protection layer and over the quenching surface of the rotating casting drum; and transferring the material layer stack from the rotating casting drum to a continuous flexible substrate, wherein the quenching surface of the rotating casting drum is cooled to a temperature at which the layers of the material layer stack solidify.

9. The method of claim 8, further comprising:
guiding the continuous flexible substrate in a vacuum chamber using a roller arrangement.

10. The method of claim 9, wherein transferring the material layer stack from the rotating casting drum to the continuous flexible substrate further comprises removing the material layer stack from the peeling layer.

11. The method of claim 10, wherein the molten lithium metal is delivered toward the quenching surface of the rotating casting drum by a deposition process selected from sputtering, thermal evaporation, e-beam evaporation, slot-die coating, casting nozzle coating, roller coating, subsonic spraying, electrostatic spraying, gas pressure spraying, thermal spraying, and plasma spraying.

12. The method of claim 10, wherein the molten lithium metal or molten metal alloy is delivered toward the quenching surface of the rotating casting drum by a spraying process selected from subsonic spraying, electrostatic spraying, gas pressure spraying, thermal spraying, and plasma spraying.

13. A method, comprising:
delivering a transfer liquid to a quenching surface of a rotating casting drum;
forming a material layer stack, comprising:
forming a first layer on the transfer liquid;
forming a second layer on the first layer, wherein at least one of forming the first layer and forming the second layer comprises delivering a molten metal over the quenching surface of the rotating casting drum; and
forming a third layer on the second layer; and
transferring the material layer stack from the rotating casting drum to a continuous flexible substrate, wherein the quenching surface of the rotating casting drum is cooled to a temperature at which the layers of the material layer stack solidify.

14. The method of claim 13, wherein the transfer liquid forms a peeling layer on the quenching surface of the rotating casting drum, wherein the first layer is a surface protection film, wherein the second layer is a molten metal or molten metal alloy layer, and wherein the third layer is an anode film.

15. The method of claim 14, wherein the anode film is constructed from graphite, silicon, silicon-containing graphite, lithium metal, lithium metal foil or a lithium alloy foil.

16. The method of claim 14, wherein forming the surface protection film comprises delivering a protection layer forming liquid toward the quenching surface, which solidifies on the peeling layer to form the surface protection film.

17. The method of claim 14, wherein the surface protection film is selected from LiF, $BiTe_3$, Cu, Sn, $LiNO_3$, sulfide, or a combination thereof.

18. The method of claim 13, wherein the transfer liquid is applied to the casting drum via a roller coating process and where the transfer liquid is selected from ionic liquids, synthetic oils, mineral oils, molten salts, or a combination thereof.

19. The method of claim 18, wherein the continuous flexible substrate is a copper substrate and the molten metal is lithium.

20. The method of claim 13, further comprising exposing the rotating casting drum to a cleaning process.

* * * * *